United States Patent
Ko et al.

(10) Patent No.: US 8,739,192 B2
(45) Date of Patent: May 27, 2014

(54) DISC LOADING APPARATUS AND OPTICAL DISC DRIVE INCLUDING THE APPARATUS

(75) Inventors: Joung-sug Ko, Seoul (KR); Sang-yun Baek, Seongnam-si (KR); Un-jin Choi, Suwon-si (KR); Cheol-woong Ahn, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/568,648

(22) Filed: Aug. 7, 2012

(65) Prior Publication Data

US 2013/0047170 A1 Feb. 21, 2013

(30) Foreign Application Priority Data

Aug. 18, 2011 (KR) ........................ 10-2011-0082338

(51) Int. Cl.
 *G11B 17/04* (2006.01)
(52) U.S. Cl.
 USPC ........................................ 720/623
(58) Field of Classification Search
 USPC ........................................ 720/623
 See application file for complete search history.

(56) References Cited

U.S. PATENT DOCUMENTS

| | | | | |
|---|---|---|---|---|
| 7,356,825 | B2* | 4/2008 | Makisaka et al. | 720/626 |
| 7,840,972 | B2* | 11/2010 | Ahn et al. | 720/623 |
| 8,024,747 | B2* | 9/2011 | Narui et al. | 720/623 |
| 8,132,193 | B2* | 3/2012 | Ahn et al. | 720/617 |
| 8,286,200 | B2* | 10/2012 | Tsutsumi et al. | 720/623 |
| 2007/0192776 | A1* | 8/2007 | Ahn et al. | 720/623 |
| 2009/0271810 | A1 | 10/2009 | Ahn et al. | |

* cited by examiner

*Primary Examiner* — Mark Blouin
(74) *Attorney, Agent, or Firm* — NSIP Law (57) ABSTRACT

A disc loading apparatus includes a frame base, and a sub-frame disposed on the frame base and including a turntable configured to drive a disc. The disc loading apparatus also includes a loading lever disposed on the frame base and configured to load the disc on the turntable. The disc loading apparatus includes an eject lever disposed on the frame base and configured to eject the disc from the turntable to the outside of the frame base, and an eject roller disposed at a leading end of the eject lever and configured to contact an edge of the disc. An elastic skirt portion in the disc loading apparatus includes a skirt, disposed adjacent to the eject roller, and an elastic extension portion extending from the skirt.

21 Claims, 12 Drawing Sheets

DISC LOADING APPARATUS AND OPTICAL DISC DRIVE INCLUDING THE APPARATUS

CROSS-REFERENCE TO RELATED APPLICATIONS

This application claims the benefit, under 35 USC 119(a), of Korean Patent Application No. 10-2011-0082338, filed on Aug. 18, 2011, in the Korean Intellectual Property Office, the disclosure of which is incorporated herein in its entirety by reference.

BACKGROUND

1. Field

The following description relates to a slot-in type optical disc loading apparatus and an optical disc drive employing the same.

2. Description of the Related Art

A slot-in type optical disc drive for loading a disc without a tray may include a complicated disc loading apparatus. The disc loading apparatus includes a plurality of levers for loading the disc. A disc loading apparatus is required to stably transfer a disc, have a small number of parts, and be economical to manufacture.

In one example of a slot-in type, an optical disc drive including a disc contact roller is provided in a unitary body. The disc contact roller is at a leading end of a disc eject lever that pivots in a direction in which a disc is ejected. When the disc is being loaded, a turntable is arranged relatively lower than an operational position of the disc. As the disc enters the optical disc drive, the disc contact roller, which is located above the turntable, contacts one side of a leading portion of the disc, as it enters the optical disc drive. The disc contact roller guides the disc throughout a loading operation, while preventing a recording surface of the disc, as it passes over the turntable, from contacting an upper surface of the turntable. A conventional disc guide structure, such as the disc contact roller, may be improved to achieve a safe and a stable disc loading.

SUMMARY

In one general aspect, there is provided a disc loading apparatus, including a frame base, a sub-frame disposed on the frame base and including a turntable configured to drive a disc, and a loading lever disposed on the frame base and configured to load the disc on the turntable. The disc loading apparatus also includes an eject lever disposed on the frame base and configured to eject the disc from the turntable to the outside of the frame base, an eject roller disposed at a leading end of the eject lever and configured to contact an edge of the disc, and an elastic skirt portion including a skirt, disposed adjacent to the eject roller, and an elastic extension portion extending from the skirt.

A through hole is disposed in the skirt and through which the eject roller passes. The skirt has a shape that encompasses a lower portion of the eject roller.

A protruding portion is disposed at one side of the skirt and including an inclined surface configured to contact an edge of the disc being loaded.

The disc loading apparatus further includes a guide wall integrally disposed at one side of the frame base and configured to guide the loading of the disc, and a pivot-type disc centering lever disposed adjacent to the guide wall and configured to center the disc with respect to the turntable.

The disc guide wall includes a linear guide wall disposed parallel to a direction in which the disc enters, and a curved guide wall disposed to correspond to a curved edge of the disc.

The disc centering lever includes a rotational shaft coupled to the frame base, and an operation wall body configured to contact and separate from an edge portion of the disc.

The disc centering lever includes a rotational shaft coupled to the frame base, and an operation wall body configured to contact and separate from an edge portion of the disc.

The skirt is configured to support an edge of a lower surface of the disc and wherein the elastic extension portion includes an end portion fixed to the eject lever.

In accordance with another general aspect, there is provided an optical disc drive, including a frame base, a sub-frame disposed on the frame base, and a spindle motor disposed on the sub-frame and including a turntable configured to receive a disc. The optical disc drive also includes an optical pickup device disposed at one side of the spindle motor and configured to access a recording surface of the disc, and a loading lever disposed on the frame base and configured to load the disc on the turntable. The optical disc drive includes an eject lever configured to eject the disc loaded on the turntable from a rear side of the frame base, an eject roller disposed at a leading end of the eject lever and configured to contact an edge of the disc, and an elastic skirt portion including a skirt, disposed adjacent to the eject roller, and an elastic extension portion extending from the skirt.

The skirt is configured to support an edge of a lower surface of the disc and wherein the elastic extension portion includes an end portion fixed to the eject lever.

The optical disc drive also includes a through hole disposed in the skirt and through which the eject roller passes. The skirt has a shape that encompasses a lower portion of the eject roller.

The optical disc drive includes a protruding portion disposed at one side of the skirt. The protruding portion includes an inclined surface configured to contact an edge of the disc being loaded.

The optical disc drive further includes a disc guide wall integrally provided at one side of the frame base and configured to guide the loading of the disc, and a pivot-type disc centering lever disposed adjacent to the guide wall and configured to center the disc on the turntable.

The disc guide wall includes a linear guide wall disposed parallel to a direction in which the disc enters and a curved guide wall disposed to correspond to a curved edge of the disc.

The disc centering lever includes a rotational shaft coupled to the frame base and an operation wall body configured to contact and separate from an edge portion of the disc.

In another aspect, there is provided an optical disc apparatus, including a frame base, a sub-frame disposed on the frame base, a spindle motor disposed on the sub-frame and including a turntable configured to receive a disc, and an optical pickup device disposed at one side of the spindle motor on the sub-frame and configured to access a recording surface of the disc. The optical disc apparatus includes a loading lever disposed on the frame base and configured to load the disc on the turntable, an eject lever configured to eject the disc loaded on the turntable from a rear side of the frame base, and an eject roller disposed at a leading end of the eject lever and configured to contact an edge of the disc. The optical disc apparatus includes an elastic skirt portion including a skirt, disposed adjacent to the eject roller, and an elastic extension portion extending from the skirt, a disc loading motor configured to drive the eject lever, and an engagement structure configured to transfer power from the loading motor to the eject lever.

The skirt is configured to support an edge of a lower surface of the disc and wherein the elastic extension portion includes an end portion fixed to the eject lever.

The optical disc apparatus also includes a through hole disposed in the skirt and through which the eject roller passes. The skirt has a shape that encompasses a lower portion of the eject roller.

The optical disc apparatus also includes a protruding portion, disposed at one side of the skirt and including an inclined surface configured to contact an edge of the disc being loaded.

The engagement structure includes a gear train connected to the loading motor, a main slider engaged with the gear train and configured to operate the loading lever, and a sub-slider configured to be operated by the main slider and operate the eject lever.

The optical disc apparatus also includes a disc guide wall, having a linear guide wall disposed parallel to a direction in which the disc enters, and a curved guide wall configured to correspond to a curved edge of the disc.

Other features and aspects will be apparent from the following detailed description, drawings, and claims.

BRIEF DESCRIPTION OF THE DRAWINGS

The above and other features and advantages of the present invention will become more apparent by describing in detail exemplary embodiments thereof with reference to the attached drawings in which:

FIGS. 7A to 13 are views illustrating examples of loading and unloading of a disc in the optical disc drive.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
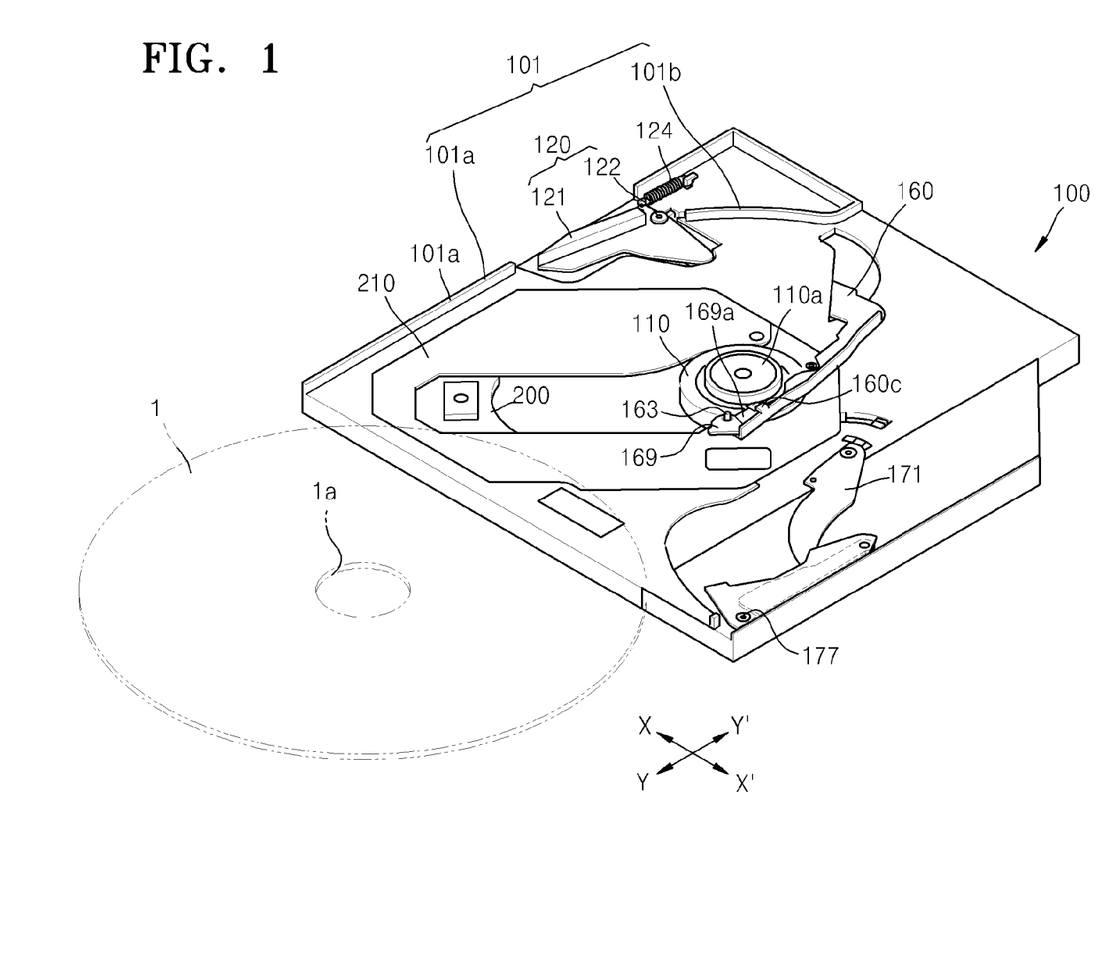
FIG. 1 is a perspective view schematically illustrating an example of an optical disc drive and a disc loading apparatus.
Figure 2:
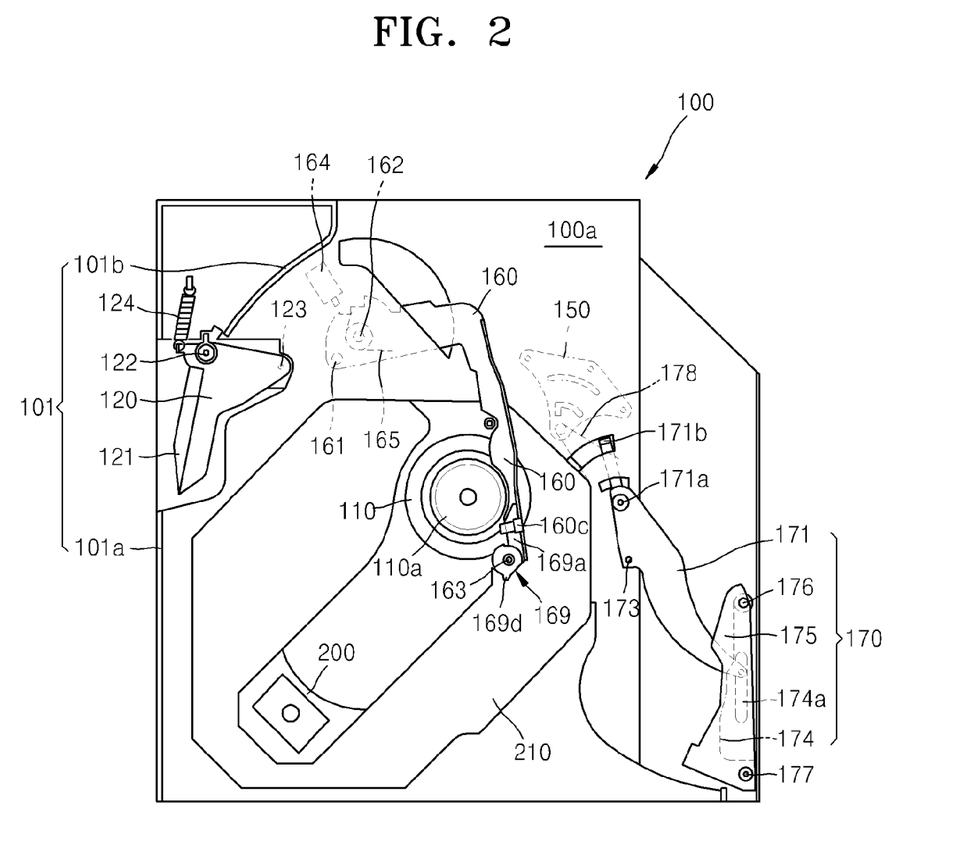
FIG. 2 is a plan view illustrating an example of the optical disc drive of FIG. 1.

FIG. 1 is a perspective view schematically illustrating an example an optical disc drive and a disc loading apparatus. FIG. 2 is a plan view illustrating an example of the optical disc drive of FIG. 1. The optical disc drive of FIGS. 1 and 2 includes a spindle motor 110 having a turntable 110a, where a disc 1 with a center hole 1a is mounted, and a sub-frame 210 for supporting the spindle motor 110. The spindle motor 110 and sub-frame 210 are arranged at a center portion of a frame base 100 having an upper surface 100a facing a recording surface of the disc 1. The sub-frame 210 pivots a predetermined angle around a direction perpendicular to the upper surface 100a of the frame base 100 so that the turntable 110a moves up and down. A guide wall 101 for guiding the disc 1 at a fixed position is disposed at one side of the frame base 100. The guide wall 101 includes a linear guide wall 101a and a curved guide wall 101b fixed on the frame base 100. The linear guide wall 101a is parallel to a direction in which the disc 1 enters, whereas the curved guide wall 101b is formed corresponding to an edge of the disc 1.

A pivot-type disc centering lever 120 to center the disc 1 on the turntable 110a is disposed between the linear guide wall 101a and the curved guide wall 101b. The disc centering lever 120 includes an operation wall body 121 arranged in a direction Y-Y' in which the linear guide wall 101a extends. The disc centering lever 120 contacts and is separated from an edge portion of the disc 1. The disc centering lever 120 also includes a rotational shaft 122, which is rotatably coupled to the frame base 100, and a guide pin 123 engaged with a sub-slider 130 (see FIG. 6). The sub-slider 130 is engaged with a main slider 140 (see FIG. 6) via a rotational link lever 150. The main slider 140, the sub-slider 130, and the rotational link lever 150 are elements belonging to an engagement structure to operate a loading lever 170 and an eject lever 160. The disc centering lever 120 is elastically biased by a tension spring 124 in a direction away from the spindle motor 110.

In the frame base 100, the loading lever 170, which is an element of the disc loading apparatus, is disposed at the opposite side of the linear guide wall 101a (see FIG. 2). The loading lever 170 includes a first loading lever 171 operating on the main slider 140 (see FIG. 6) and a second loading lever 175 engaged with the first loading lever 171. The first and second loading levers 171 and 175 include rotational shafts 171a and 176, respectively, which are rotatably coupled to the frame base 100. The first loading lever 171 is elastically biased clockwise by a spring 178 elastically pressing on a portion 171b provided at an end portion thereof and is disposed at a rear side thereof, with a rear-end portion 173 engaged with a cam groove 145 (see FIG. 6). The cam groove 145 is disposed in the main slider 140. A loading member 177 contacting the edge of the disc 1 is disposed at a leading end of the second loading lever 175. An end portion of one side of the first loading lever 171 is coupled to a cam 174a, between the rotational shaft 176 of the second loading lever 175 and the loading member 177. The cam 174a is formed on a cam member 174 that is integrally coupled to the second loading lever 175. Accordingly, when the main slider 140 is operated by a disc loading motor 180, the first and second loading levers 171 and 175 pivot in the same direction.

The spindle motor 110, an optical pickup device 200, and guide shafts 211 and 212 support a motion of the optical pickup device 200 and are mounted on the sub-frame 210. The sub-frame 210 is coupled to the frame base 100 and has one part that is rotatably hinge-coupled to the frame base 100 and an opposite part mounted to move up and down in a direction perpendicular to the upper surface 100a of the frame base 100, by engaging with the main slide 140 and the sub-slider 130.

The eject lever 160 for ejecting the disc 1 loaded on the turntable 110a is located at the rear of the spindle motor 110. The eject lever 160 includes a rotational shaft 162 coupled to the frame base 100 and an engagement pin 161 to engage the sub-slider 130. The eject lever 160 is elastically biased by a torsion spring 165, disposed on the rotational shaft 162, in a direction to push the disc 1. An ejector roller 163 contacts the edge of the disc 1 and an elastic skirt portion that is disposed adjacent to the eject roller 163. The ejector roller 163 and the elastic skirt portion are disposed at a leading end of the eject lever 160. The elastic skirt portion includes a skirt 169 and an elastic extension portion 169a for elastically supporting the skirt 169. The skirt 169 includes the elastic extension portion 169a having a rear end fixed by a fixing portion 160c. The fixing portion 160c is disposed at the leading end portion of the eject lever 160. Thus, the skirt 169 is elastically supported by the elastic extension portion 169a.

Figure 3:
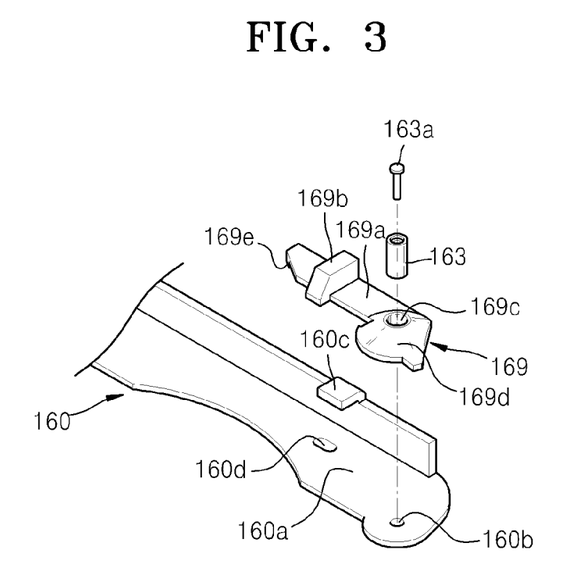
FIG. 3 is a partial exploded perspective view illustrating an example of an eject lever portion in the optical disc drive of FIG. 1.
Figure 4:
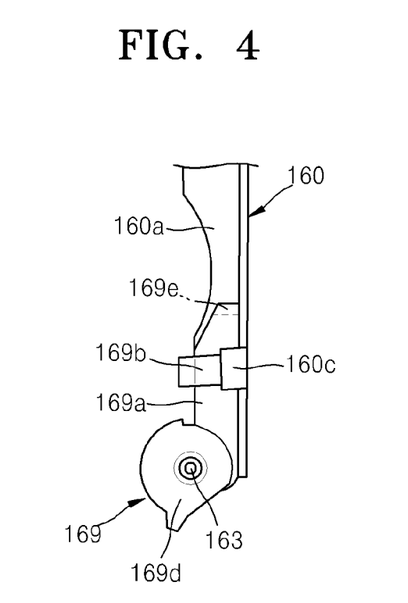
FIG. 4 is a partial plan view illustrating an example of the eject lever portion in the optical disc drive of FIG. 1.
Figure 5:
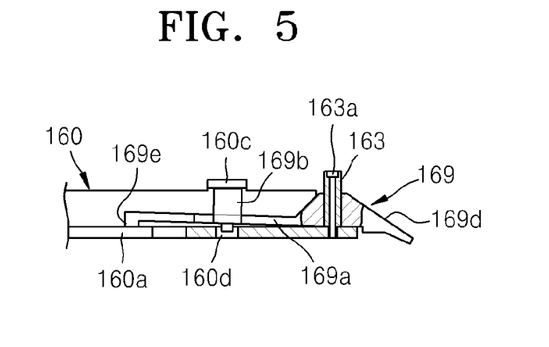
FIG. 5 is a partial cross-sectional view illustrating an example of the eject lever portion in the optical disc drive of FIG. 1.

FIG. 3 is a partial exploded perspective view illustrating an example of an eject lever portion in the optical disc drive of FIG. 1. FIG. 4 is a partial plan view illustrating an example of the eject lever portion in the optical disc drive of FIG. 1. FIG. 5 is a partial cross-sectional view illustrating an example of the eject lever portion in the optical disc drive of FIG. 1.

As shown in FIG. 3, a through hole 169c, in which the eject roller 163 is mounted, is formed at a center of the skirt 169, where an inclined protruding portion 169d is disposed at one side thereof. A fixing hole 160b (see FIG. 3) for fixing the rotation shaft 163a passing through the eject roller 163 is formed at the leading-end portion of the eject lever 160 corresponding thereto. A protruding portion 169d, protruding downwardly under a lower surface of the eject lever 160, is disposed at the skirt 169. The protruding portion 169d is a disc-edge guiding portion that is located under an upper surface of the turntable 110a during loading of the disc 1. The edge of the disc 1 ascends along an inclined surface of the protruding portion 169d to contact the eject roller 163. The elastic extension portion 169a connects the skirt 169 to the eject lever 160. A protruding spacer 169e, contacting an upper surface 160a of the eject lever 160, is formed on a lower surface of a read end of the elastic extension portion 169a. The protruding spacer 169e inclines the elastic extension portion 169a relative to the upper surface 160a of the eject lever 160. Accordingly, the protruding portion 169d is arranged to be positioned relatively lower than the upper surface 160a of the eject lever 160. As the fixing portion 160c presses a pressing portion 169b, disposed on the elastic extension portion 169a, the elastic extension portion 169a is appropriately deformed.

A through hole 160d is formed in the upper surface 160a of the eject lever 160, directly under the fixing portion 160c. The protruding portion 169d, which prevents rotation of the elastic deformation portion (see FIG. 5) that enters the through hole 160d, is correspondingly formed on the lower surface of the elastic extension portion 169a. The elastic extension portion 169a is elastically deformed as the protruding portion 169d contacts the upper surface 100a of the frame base 100. The elastic extension portion 169a is elastically deformed because the lower surface of the eject lever 160 substantially matches the upper surface 100a of the frame base 100. In other words, during loading of the disc 1, when the disc 1 pushes the leading end portion of the eject lever 160 on the upper surface 100a of the frame base 100, the protruding portion 169d contacts the upper surface 100a of the frame base 100 at a predetermined pressure so that the elastic extension portion 169a supporting the skirt 169 is elastically deformed. Although the skirt 169 is described to encompass the eject roller 163, the skirt 169 may partially encompass the eject roller 163 or may be formed only in a portion where the disc 1 enters. In other words, the skirt 169 may be formed adjacent to the eject roller 163 to only include the protruding portion 169d.

Figure 6:
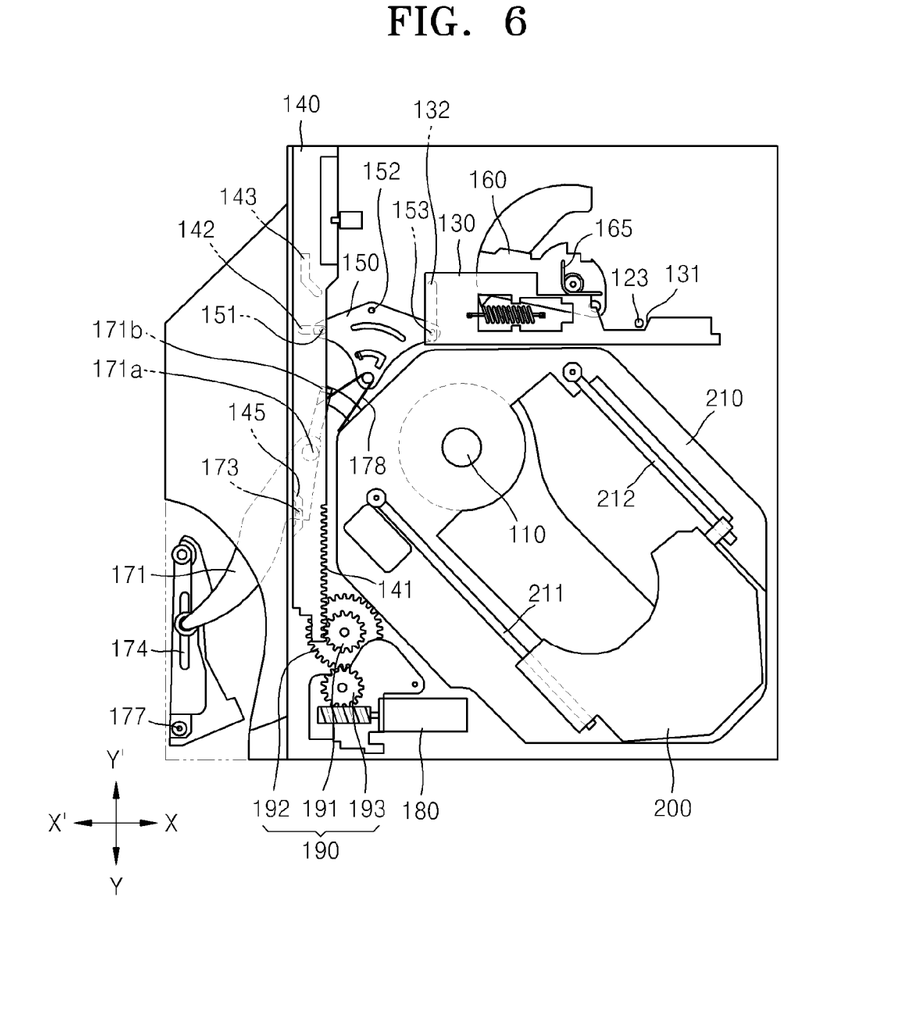
FIG. 6 is a rear view illustrating an example of the optical disc drive of FIG. 1.

FIG. 6 is a rear view illustrating an example of the optical disc drive of FIG. 1. Referring to FIG. 6, a spur gear 141 is placed at one side of the main slider 140. A gear train 190 including a plurality of gears 191, 192, and 193 is engaged with the spur gear 141. The gear train 190 transfers power from the disc loading motor 180 to the main slider 140. The rotational link lever 150 and the first loading lever 171 are engaged with each other by the operation of the main slider 140. The engagement of the main slider 140, the rotational link lever 150, and the first loading lever 171 may be performed using a cam having a cam groove and a guide pin.

The rotational link lever 150 includes first, second, and third guide pins 151, 152, and 153 that are coupled to cam grooves 142 and 143 of the main slider 140 and a cam groove 132 of the sub-slider 130. The first and second guide pins 151 and 152 are coupled to the cam grooves 142 and 143 of the main slider 140. The third guide pin 153 is coupled to the cam groove 132 disposed in the sub-slider 130. As a result, the sub-slider 130 reciprocates in a direction X-X' according to the reciprocation of the main slider 140 in a direction Y-Y' that is operated by the disc loading motor 180. The disc centering lever 120 and the eject lever 160 are engaged according to the reciprocation of the sub-slider 130.

The guide pin 123 of the disc centering lever 120 is pivoted by a cam 131 of the sub-slider 130. Because the sub-slider 130 is disposed on a lower surface of the frame base 100 to enable reciprocation, the sub-slider 130 moves in the direction X-X' perpendicular to the direction Y-Y' that the disc 1 enters and is ejected.

Figure 7A:
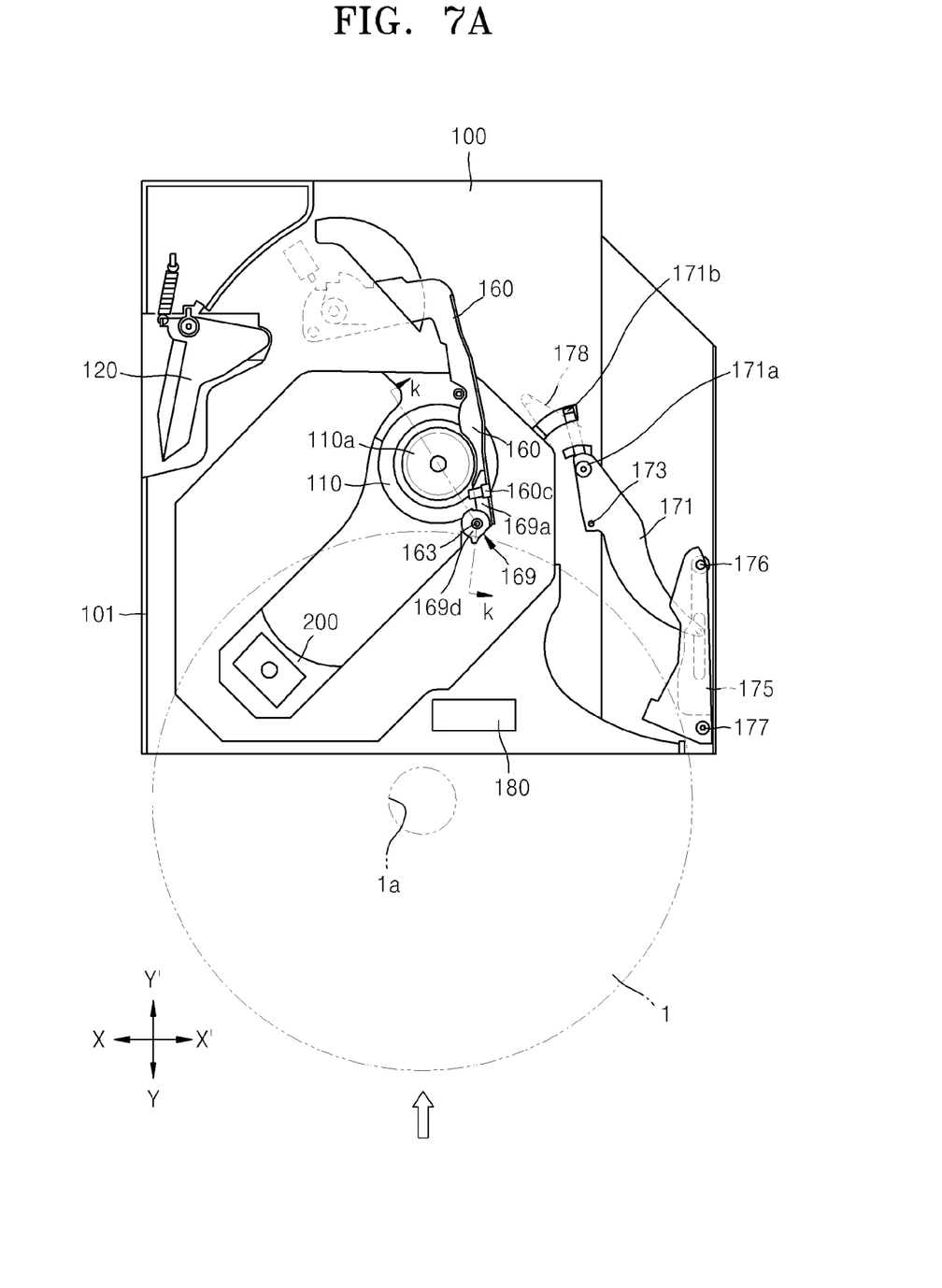

FIGS. 7A to 13 are views illustrating examples of loading and unloading of the disc 1 in the optical disc drive. the state of an optical disc drive in disc loading and unloading processes. Referring to FIG. 7A, at the insertion of the disc 1, all elements of an optical disc drive are set at initial positions. The disc centering lever 120 is elastically biased clockwise. The eject lever 160 pivots clockwise at its maximum so that the eject roller 163 is adjacent to the spindle motor 110. The second loading lever 175 pivots counterclockwise to be away from the spindle motor 110.

Figure 7B:
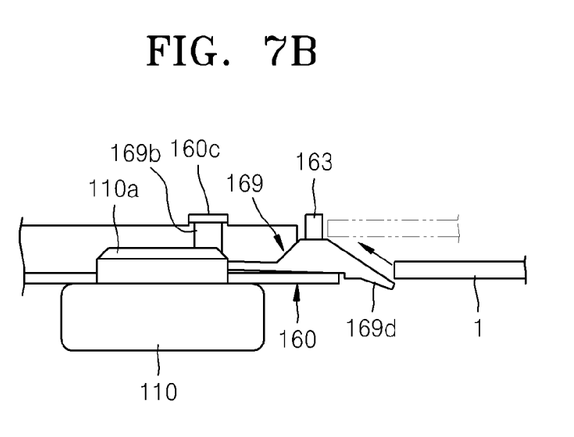
Figure 8:
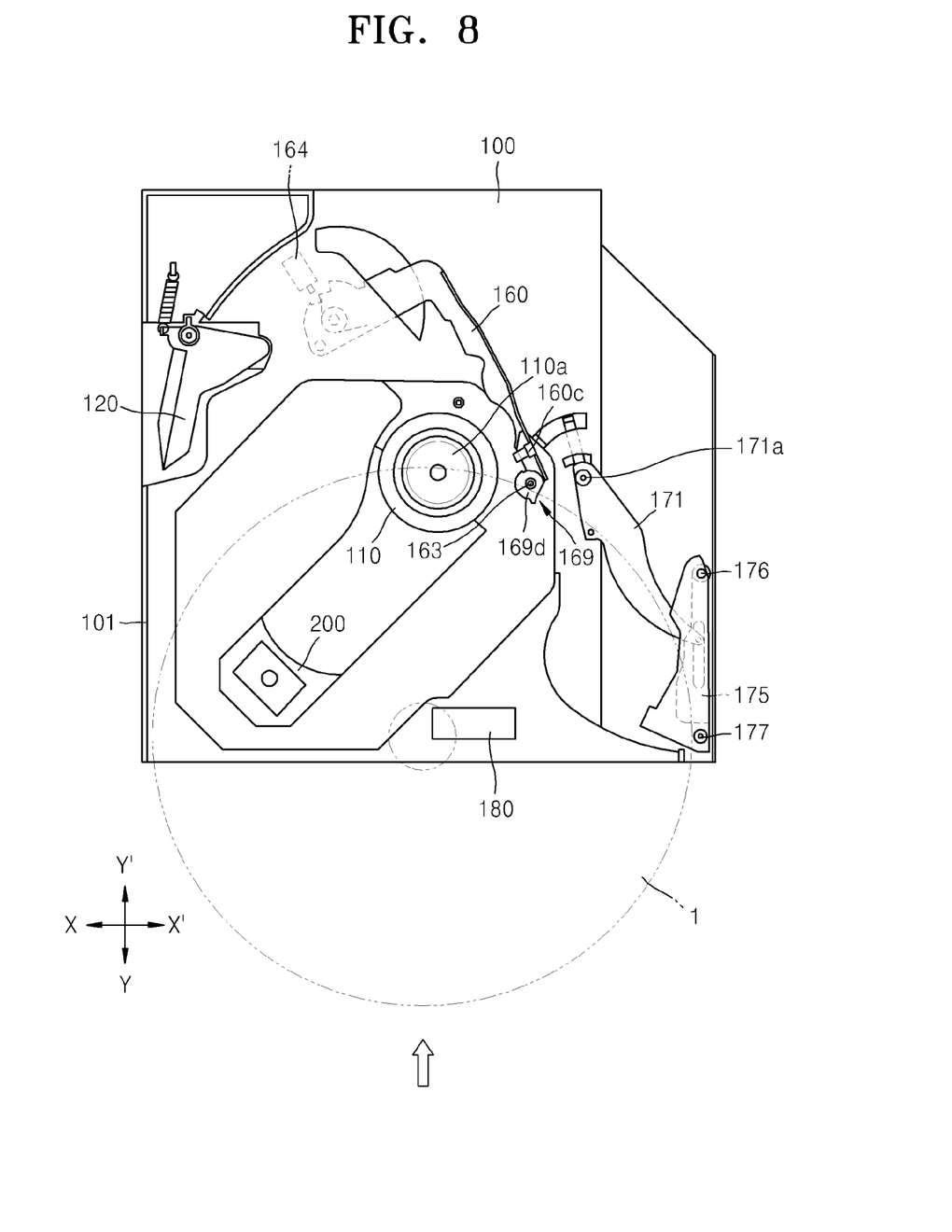

As illustrated in FIG. 7A, when the disc 1 is inserted, the disc 1 moves along the guide wall 101 located at one side of the frame base 100 and interferes with the eject roller 163 of the eject lever 160 to pivot the eject lever 160 counterclockwise. In doing so, as illustrated in FIG. 7B, the protruding portion 169d of the skirt 169, at the leading end portion of the eject lever 160, extends under the upper surface of the turntable 110a. The top surface of the skirt 169 is disposed higher than the upper surface of the turntable 110a. Thus, as the disc 1 moves further inside the optical disc drive, the disc 1 proceeds along the inclined surface of the protruding portion 169d and contacts the eject roller 163. When the edge of the disc 1 contacts the eject roller 163, the lower surface of the disc 1 is higher than the upper surface of the turntable 110a. As illustrated in FIG. 8, as the disc 1 moves further inside the optical disc drive, the disc 1 may pass over the turntable 110a without contacting the turntable 110a.

Figure 9A:
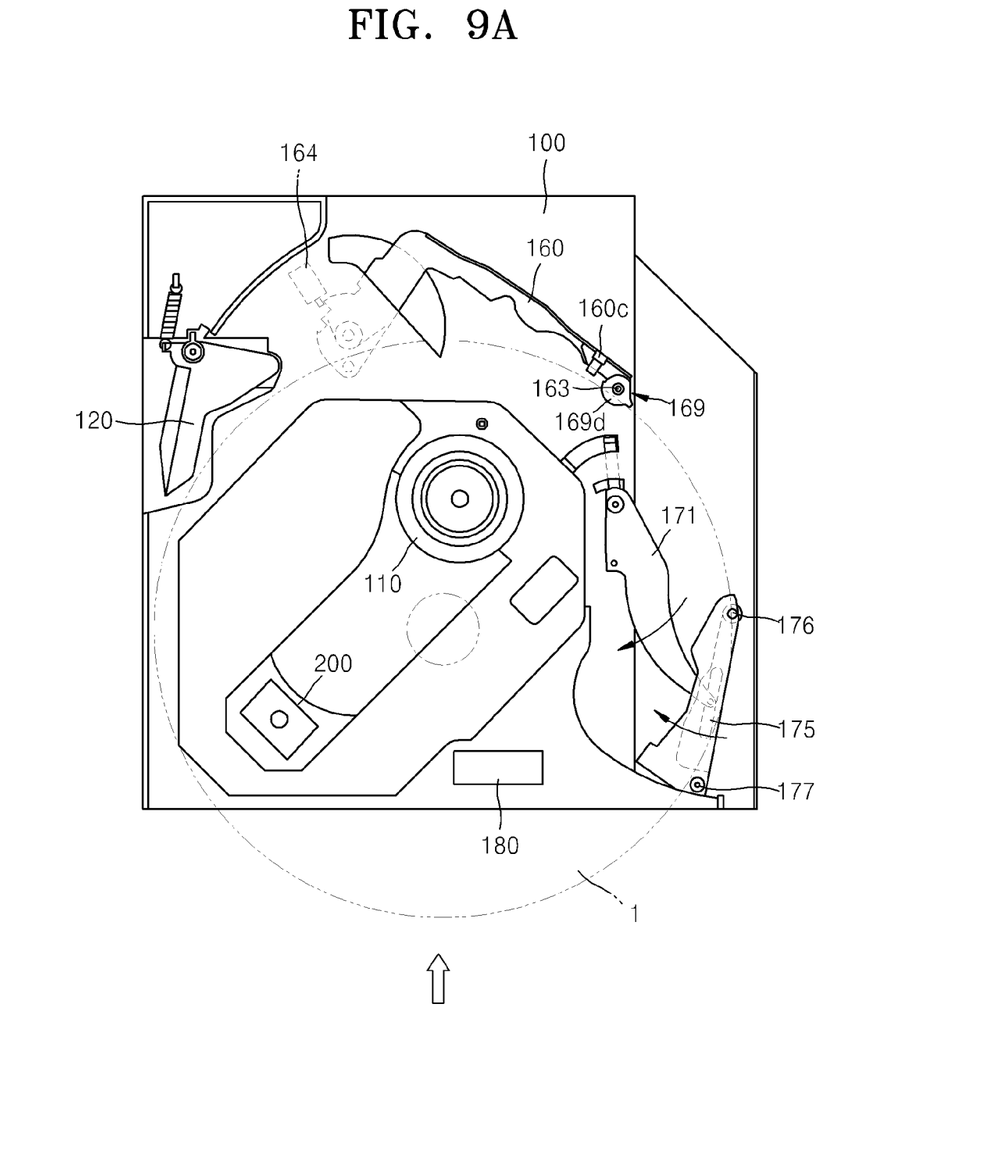
Figure 9B:
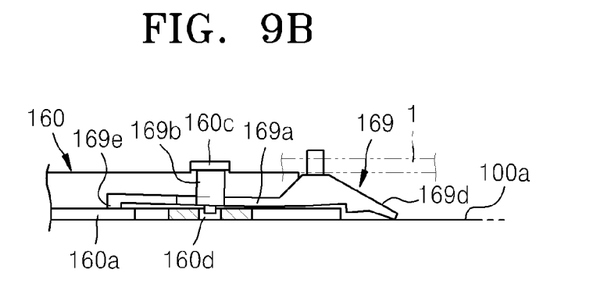

As illustrated in FIG. 9A, as the disc 1 is inserted further, a switch 164 located adjacent to the rotational shaft 162 of the eject lever 160 is turned on so that the disc loading motor 180 is operated. The disc loading motor 180 operates the main slider 140. The main slider 140 operates the loading lever 170. In one example, the loading lever 171 is directly engaged with the main slider 140 and the second loading lever 175 is engaged with the first loading lever 171. As the first loading lever 171 pivots clockwise, the second loading lever 175 also pivots clockwise. The protruding portion 169d of the skirt 169, supporting the edge of the disc 1, contacts the upper surface 100a of the frame base 100. Thus, the elastic extension portion 169a is bent so that the skirt 169 is lifted to a predetermined height above an upper surface of the leading end portion of the eject lever 160.

Figure 10:
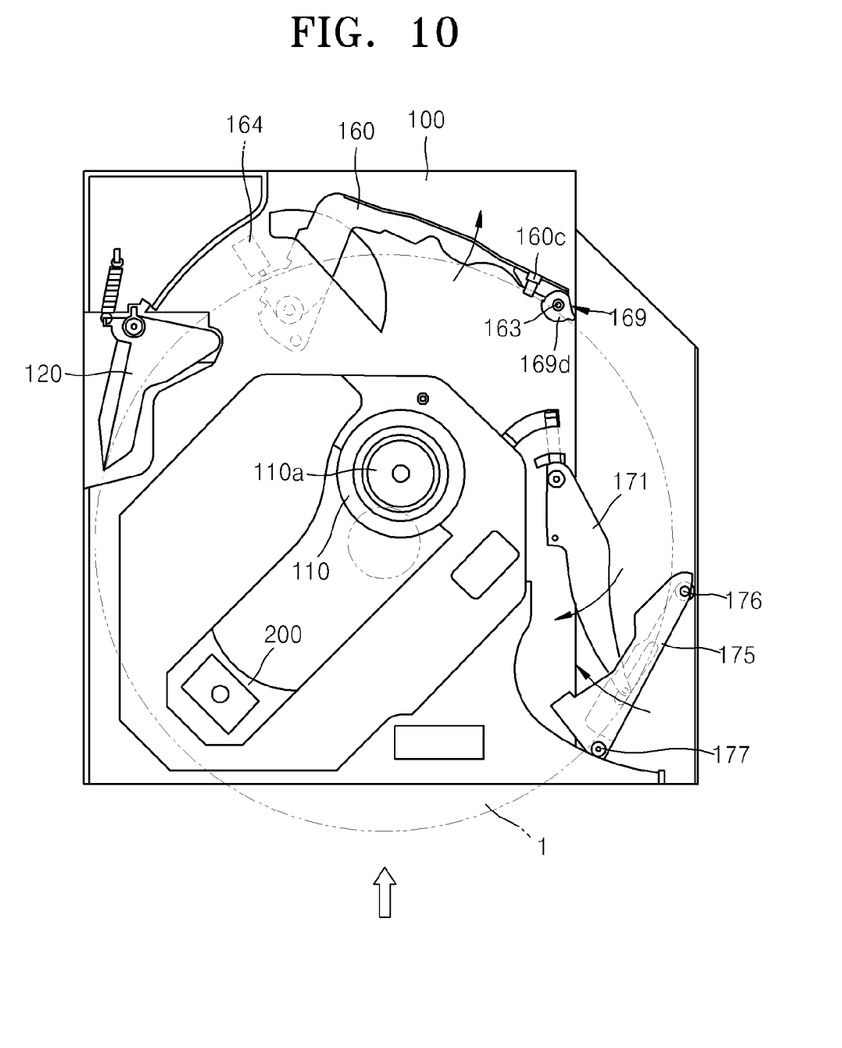
Figure 11:
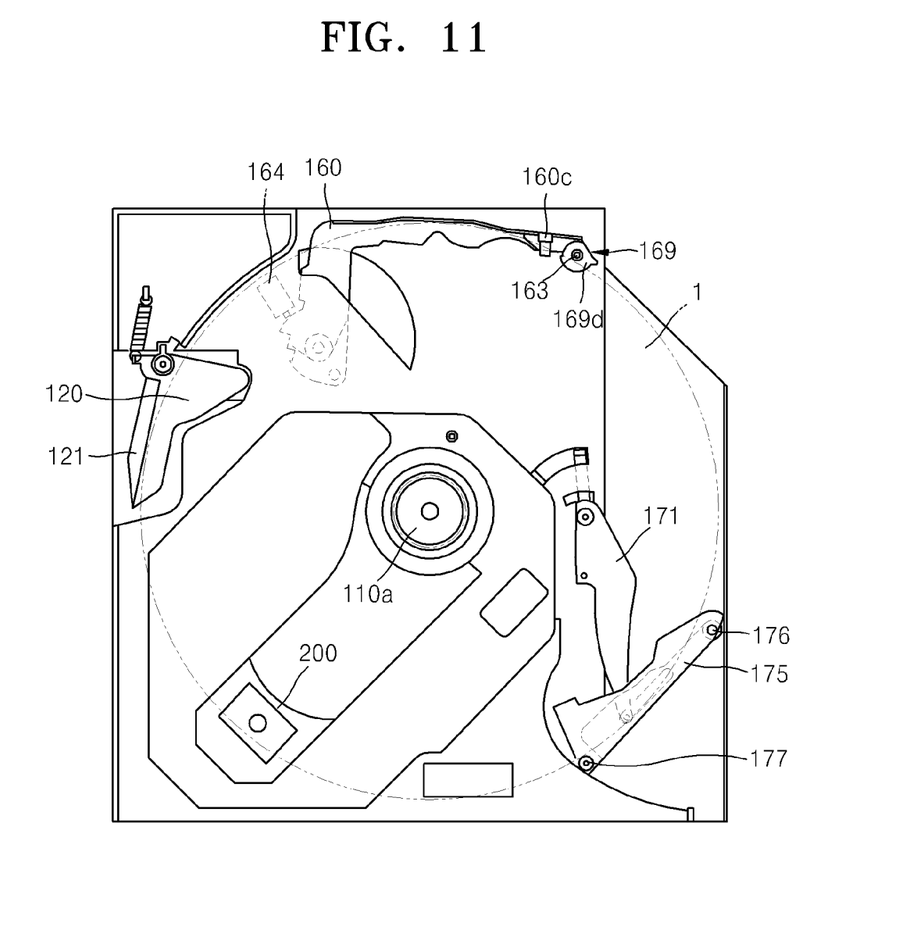
Figure 12:
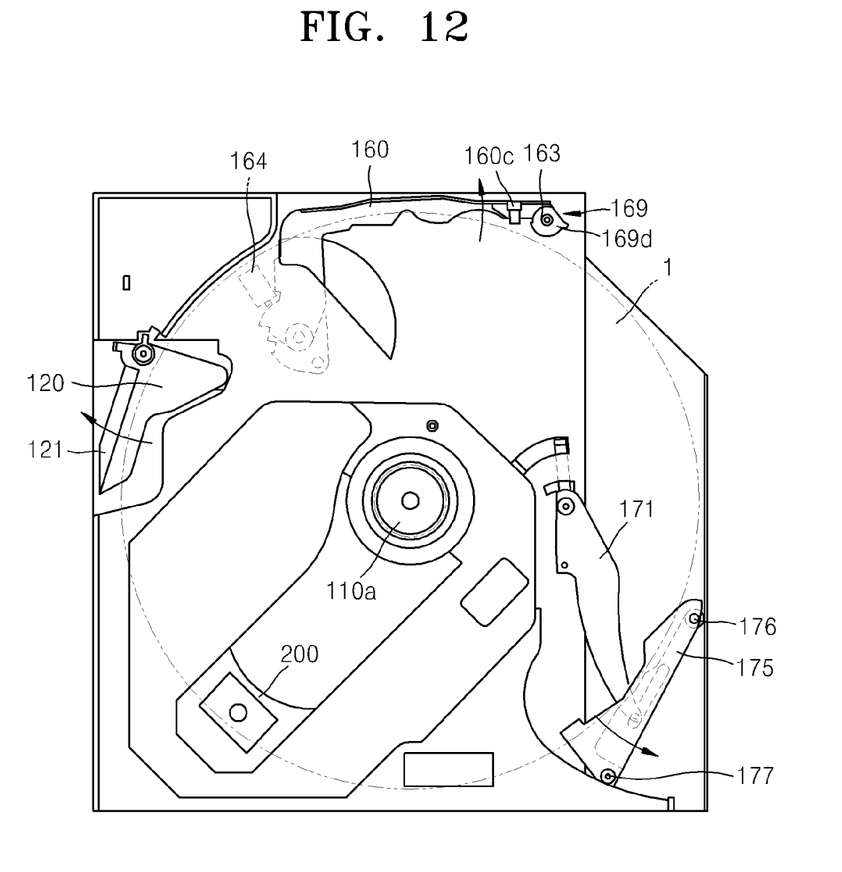
Figure 13:
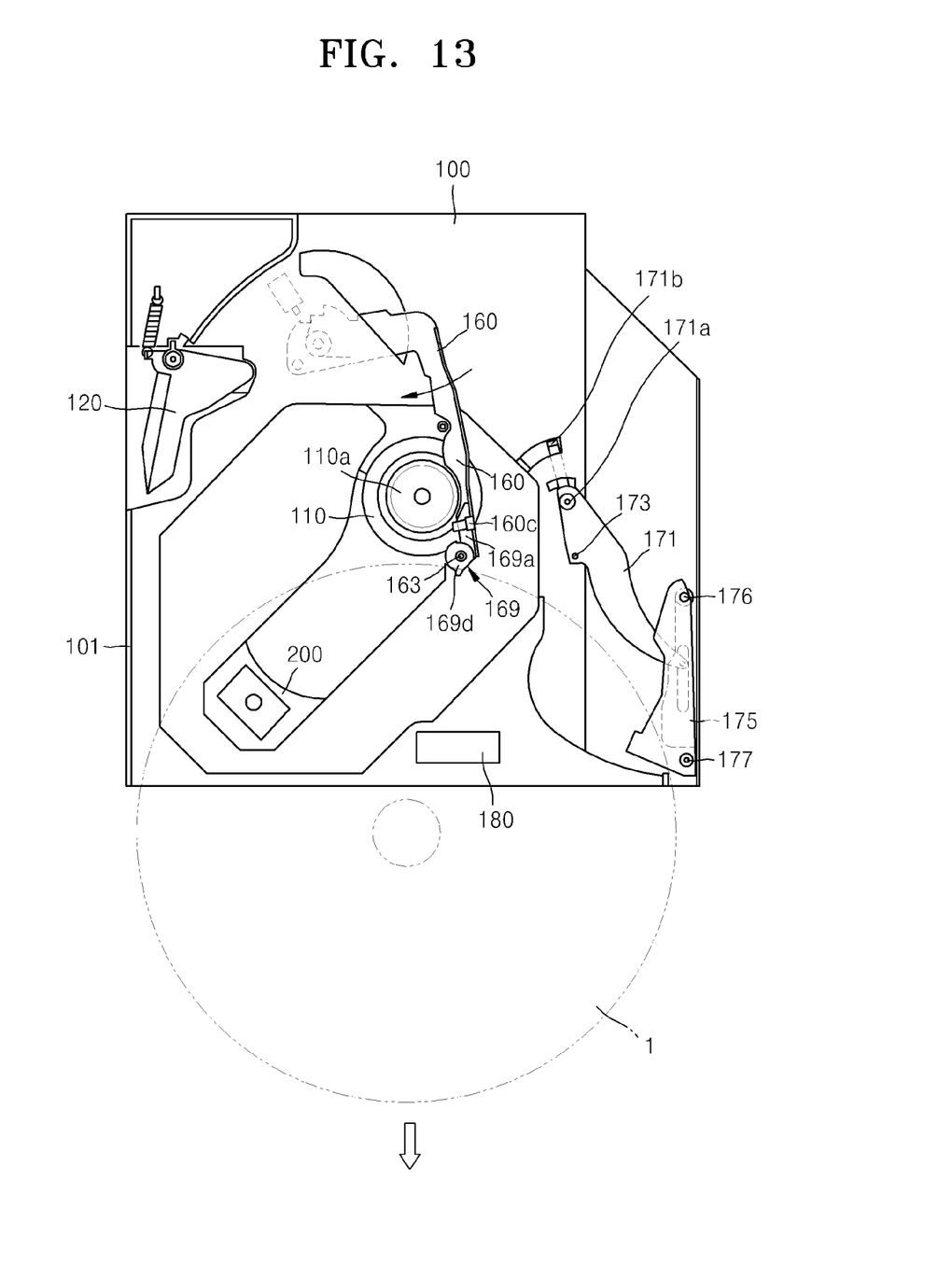

Thus, as illustrated in FIG. 10, when the first loading lever 171 loads the disc 1, without any external assistance, as illustrated in FIG. 11, the disc 1 is centered on the turntable 110a of the spindle motor 110. In doing so, the operation wall body 121 of the disc centering lever 120, the eject lever 160, and the first loading lever 171 are guided so that the center hole 1a of the disc 1 is located directly above the turntable 110a of the spindle motor 110. A switch 164 (see FIG. 11) detects whether the disc 1 is centered. The main slider 140 operates the switch 164. After the centering of the disc 1 is completed, the spindle motor 110 rises by the operation of the sub-frame 210 and, thus, the center hole 1a of the disc 1 is inserted in the turntable 110a and accommodated thereon. As illustrated in FIG. 12, when the accommodation (loading) of the disc 1 in the turntable 110a is completed, the disc centering lever 120, the eject lever 160, and the first loading lever 171 are operated. As a result, the operation wall body 121, the eject roller 163, and the loading member 177 are separated from the edge portion of the disc 1. The disc 1 may be rotated by the spindle motor 110. In one example, the separation of the operation wall body 121, the eject roller 163, and the loading member 177 from the edge portion of the disc 1 triggers the operation of the disc centering lever 120, the eject lever 160, and the second loading lever 175. The operations of the disc centering lever 120, the eject lever 160, and the second loading lever 175 are performed by a combined operation of the main slider 140 and the sub-slider 130. The disc loading motor 180 operates the main slider 140 and the sub-slider 130.

Any apparatus capable of obtaining the above-described operations may be employed and such an apparatus may be designed by those skilled in the art regarding the connection structures of the main slider 140 and the sub-slider 130.

The guide wall 101 of a fixed type may be formed on the frame base 100. A disc guide, with the disc centering lever 120 that is capable of pivoting with respect to the guide wall 101 may be included in the above description of the optical disc drive. An optical disc drive having the above features may be designed for a disc of a uniform specification, for example a disc having a diameter of 12 cm. Thus, compared to a conventional structure for accommodating discs having a plurality of sizes, the illustrative configurations described above in reference to FIGS. 1 to 13 is simplified. As a result, a manufacturing cost of the optical disk drive is lowered.

As described above, the disc loading apparatus and the optical disc drive employing the same may include simple structural configurations. In particular, a skirt having a through hole, through which an eject roller passes, may be adjacent to the eject roller that pushes a disc when the disc is unloaded. Thus, during loading and unloading of the disc, the skirt stably supports the disc. Also, during the disc loading, the disc is guided by the guide wall disposed on the frame base. During the disc loading, the centering lever may perform disc centering. The centering lever may be disposed at the rear side of the guide wall. According to these structural configurations, the manufacturing costs of the disc loading apparatus and the optical disc drive employing the same may be reduced.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A disc loading apparatus, comprising:
    a frame base;
    a sub-frame disposed on the frame base and comprising a turntable configured to drive a disc;
    a loading lever disposed on the frame base and configured to load the disc on the turntable;
    an eject lever disposed on the frame base and configured to eject the disc from the turntable to the outside of the frame base;
    an eject roller disposed at a leading end of the eject lever and configured to contact an edge of the disc; and
    an elastic skirt portion comprising a skirt, disposed adjacent to the eject roller, and an elastic extension portion extending from the skirt.

2. The disc loading apparatus of claim 1, further comprising:
    a through hole disposed in the skirt and through which the eject roller passes, wherein
    the skirt has a shape that encompasses a lower portion of the eject roller.

3. The disc loading apparatus of claim 2, further comprising:
    a protruding portion disposed at one side of the skirt and comprising an inclined surface configured to contact an edge of the disc being loaded.

4. The disc loading apparatus of claim 1, further comprising:
    a guide wall integrally disposed at one side of the frame base and configured to guide the loading of the disc, and
    a pivot-type disc centering lever disposed adjacent to the guide wall and configured to center the disc with respect to the turntable.

5. The disc loading apparatus of claim 4, wherein the disc guide wall comprises
    a linear guide wall disposed parallel to a direction in which the disc enters, and
    a curved guide wall disposed to correspond to a curved edge of the disc.

6. The disc loading apparatus of claim 5, wherein the disc centering lever comprises
    a rotational shaft coupled to the frame base, and
    an operation wall body configured to contact and separate from an edge portion of the disc.

7. The disc loading apparatus of claim 4, wherein the disc centering lever comprises
    a rotational shaft coupled to the frame base, and
    an operation wall body configured to contact and separate from an edge portion of the disc.

8. The disc loading apparatus of claim 1, wherein the skirt is configured to support an edge of a lower surface of the disc and wherein the elastic extension portion comprises an end portion fixed to the eject lever.

9. An optical disc drive, comprising:
    a frame base;
    a sub-frame disposed on the frame base;
    a spindle motor disposed on the sub-frame and comprising a turntable configured to receive a disc;
    an optical pickup device disposed at one side of the spindle motor and configured to access a recording surface of the disc;
    a loading lever disposed on the frame base and configured to load the disc on the turntable;
    an eject lever configured to eject the disc loaded on the turntable from a rear side of the frame base;
    an eject roller disposed at a leading end of the eject lever and configured to contact an edge of the disc; and
    an elastic skirt portion comprising a skirt, disposed adjacent to the eject roller, and an elastic extension portion extending from the skirt.

10. The optical disc drive of claim 9, wherein the skirt is configured to support an edge of a lower surface of the disc and wherein the elastic extension portion comprises an end portion fixed to the eject lever.

11. The optical disc drive of claim 9, further comprising:
a through hole disposed in the skirt and through which the eject roller passes, wherein
the skirt has a shape that encompasses a lower portion of the eject roller.

12. The optical disc drive of claim 11, further comprising:
a protruding portion disposed at one side of the skirt, wherein the protruding portion comprises an inclined surface configured to contact an edge of the disc being loaded.

13. The optical disc drive of claim 9, further comprising:
a disc guide wall integrally provided at one side of the frame base and configured to guide the loading of the disc, and
a pivot-type disc centering lever disposed adjacent to the guide wall and configured to center the disc on the turntable.

14. The optical disc drive of claim 13, wherein the disc guide wall comprises a linear guide wall disposed parallel to a direction in which the disc enters and a curved guide wall disposed to correspond to a curved edge of the disc.

15. The optical disc drive of claim 14, wherein the disc centering lever comprises a rotational shaft coupled to the frame base and an operation wall body configured to contact and separate from an edge portion of the disc.

16. An optical disc apparatus, comprising:
a frame base;
a sub-frame disposed on the frame base;
a spindle motor disposed on the sub-frame and comprising a turntable configured to receive a disc;
an optical pickup device disposed at one side of the spindle motor on the sub-frame and configured to access a recording surface of the disc;
a loading lever disposed on the frame base and configured to load the disc on the turntable;
an eject lever configured to eject the disc loaded on the turntable from a rear side of the frame base;
an eject roller disposed at a leading end of the eject lever and configured to contact an edge of the disc;
an elastic skirt portion comprising a skirt, disposed adjacent to the eject roller, and an elastic extension portion extending from the skirt;
a disc loading motor configured to drive the eject lever; and
an engagement structure configured to transfer power from the loading motor to the eject lever.

17. The optical disc apparatus of claim 16, wherein the skirt is configured to support an edge of a lower surface of the disc and wherein the elastic extension portion comprises an end portion fixed to the eject lever.

18. The optical disc apparatus of claim 16, further comprising:
a through hole disposed in the skirt and through which the eject roller passes, wherein
the skirt has a shape that encompasses a lower portion of the eject roller.

19. The optical disc apparatus of claim 18, further comprising:
a protruding portion, disposed at one side of the skirt and comprising an inclined surface configured to contact an edge of the disc being loaded.

20. The optical disc apparatus of claim 16, wherein the engagement structure comprises:
a gear train connected to the loading motor;
a main slider engaged with the gear train and configured to operate the loading lever; and
a sub-slider configured to be operated by the main slider and operate the eject lever.

21. The optical disc apparatus of claim 20, further comprising:
a disc guide wall, having a linear guide wall disposed parallel to a direction in which the disc enters, and a curved guide wall configured to correspond to a curved edge of the disc.

* * * * *